United States Patent [19]

Sullivan

[11] 4,265,194
[45] May 5, 1981

[54] FIRE ALARM HEAT SENSOR

[76] Inventor: Joseph T. Sullivan, 1170 Country La., Huntingdon Valley, Pa. 19006

[21] Appl. No.: 36,390

[22] Filed: May 4, 1979

[51] Int. Cl.³ .................. B67D 5/32; G01K 11/06; G08B 17/00
[52] U.S. Cl. .................. 116/106; 169/42; 222/39
[58] Field of Search .............. 116/106, 5, 217; 222/3, 222/39; 73/362.8; 169/42

[56] References Cited

U.S. PATENT DOCUMENTS

| | | | |
|---|---|---|---|
| 2,431,110 | 11/1947 | Clair | 169/42 X |
| 3,044,555 | 7/1962 | Allen | 169/42 |
| 3,192,890 | 7/1965 | Smith | 116/106 X |
| 3,244,137 | 4/1966 | Garvey | 116/112 X |
| 3,530,817 | 9/1970 | Garvey | 116/106 |
| 3,667,419 | 6/1972 | Sullivan | 116/106 |
| 4,052,690 | 10/1977 | Jacoby | 337/405 |
| 4,121,533 | 10/1978 | Pappas et al. | 116/106 X |

Primary Examiner—Daniel M. Yasich
Attorney, Agent, or Firm—Paul & Paul

[57] ABSTRACT

A heat sensor is provided having a support member, an actuating member mounted pivotally therewith by a spring operatively engaging, in tensioned condition, a portion of the support member and the actuating member, and a member fabricated of two separable portions each bound to the other by fusible material which when fused at a predetermined temperature permits the two separable portions to be released, thus activating the heat sensor. It is also contemplated that the heat sensor operate in conjunction with a canister of compressed gas and a horn which are operatively associated with the heat sensor to sound an alarm when the heat sensor is activated.

5 Claims, 7 Drawing Figures

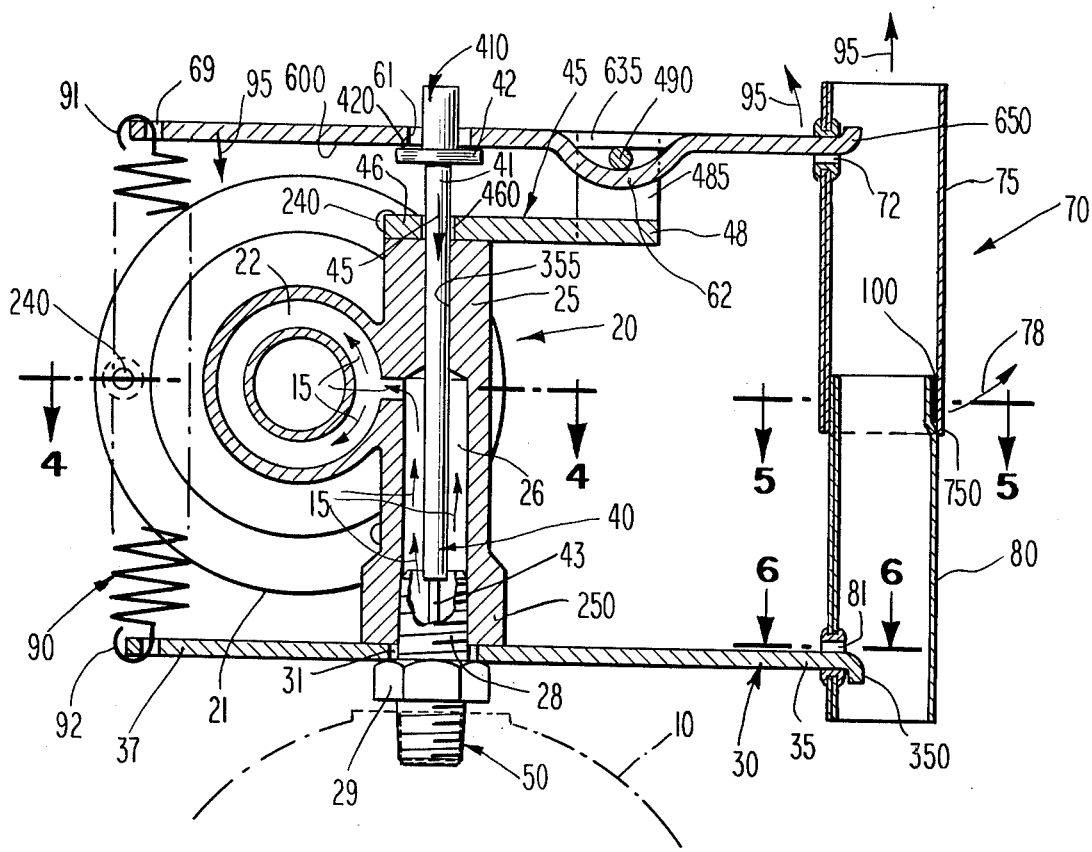
*Fig. 3*
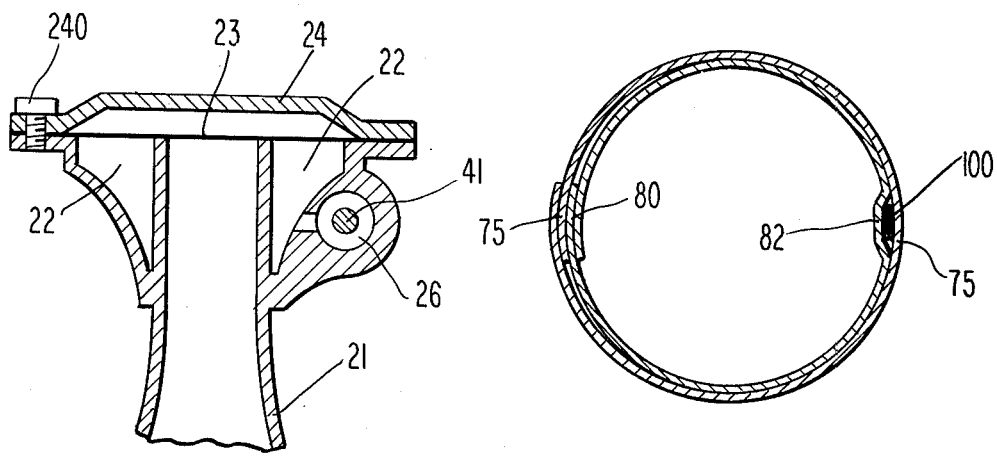
*Fig. 4*   *Fig. 5*

FIRE ALARM HEAT SENSOR

BACKGROUND OF THE INVENTION (a) Scope of the Invention

The present invention relates generally to a heat sensing device which is activated at a predetermined temperature, and more particularly, is directed to a heat sensor for use in fire alarm systems. It may contain means cooperatively associated therewith to sound an alarm.

(b) Prior Art Statement

Generally, heat detecting and sensing units, as presently designed, are responsive to the presence of heat in the relatively immediate environment in which they are located. They are generally designed for either a fixed temperature response or a rate of rise temperature response. The present invention is directed to the former type of system.

Heat detection and sensing responses to predetermined elevated temperatures have been accomplished in any number of ways, such as, for example, by obstructing a conduit between a compressed gas tank and an alarm sounding horn with a low melting temperature alloy such as eutectic solder. When the solder is fused, the obstruction is cleared and the alarm sounding apparatus is activated.

Such devices generally suffer from insensitivity and therefore, a larger number of such units are required to be installed to protect a given area. Most recently, efforts have been made to develop more sensitive heat sensors, an example of which is described in U.S. Pat. No. 4,052,690. This detection device utilizes a thin disk to collect and transmit heat to a eutectic solder which melts to actuate a valve. It is directed to a somewhat complex assembly requiring special attaching strips with insulative phenolic plastic portions. Some of the attaching strips are soldered with conventional 50-50 solder while others are soldered with eutectic solder. This type of sensor is disclosed as being utilized with an alarm system. Once the eutectic solder melts, the alarm sounds until all of the compressed gas is released; there is no provision for deactivating the alarm.

Another problem encountered by such systems is that they do not activate and/or sound an alarm at the earliest possible time since the response which activates the system does not positively trigger the alarm when the surrounding environment reaches the previously selected activating temperature. In many instances, this can be caused by a heat sensor which is not truely responsive to the surrounding environment, one in which the heat is not properly transmitted to the eutectic bonding material, and even more often, one in which the containment and release mechanisms for the eutectic bond are not properly designed to insure an early and positive release of the bond.

SUMMARY OF THE INVENTION

One object of the present invention is to alleviate the aforementioned problems set forth with respect to heat sensors and their related systems.

Another object of the present invention is to provide an improved heat sensor.

Still another object of the present invention is to provide an improved heat sensor for use with a fire alarm system.

Still another object is to provide a heat sensor which automatically sounds an alarm yet may manually be deactivated to stop the alarm.

Still yet another object is to provide a positively activated heat sensor having novel actuating means operating cooperatively with novel heat responsive means.

Still yet a further object is to provide novel heat responsive means comprising an assembly of interengaging substantially cylindrical elements for collecting heat and transferring such heat to a fusible material which upon fusing releases said cylindrical elements from each other.

Still yet a further object is to provide a pair of telescoping cylindrical sleeves which form the novel heat responsive means are are positively released from each other at a predetermined temperature by the actuating means.

And still yet a further object is to provide an improved super-sensitive heat sensor for use with an alarm system, one which is durable, yet simple to manufacture and maintain and therefore, economical.

Other objects will become apparent to those skilled in the art by referring to the following Brief Description of the Drawing Figures, the Detailed Description of the Preferred Embodiment and the appended Claims, when taken in conjunction with the drawing figures.

BRIEF DESCRIPTION OF THE DRAWING FIGURES

FIG. 3 is a sectional view taken along the line 3—3 as shown in FIG. 1.

FIG. 4 is a sectional view taken along the line 4—4 as shown in FIG. 3.

FIG. 5 is a sectional view taken along the line 5—5 as shown in FIG. 3.

DETAILED DESCRIPTION OF THE PREFERRED EMBODIMENT

Figure 1:
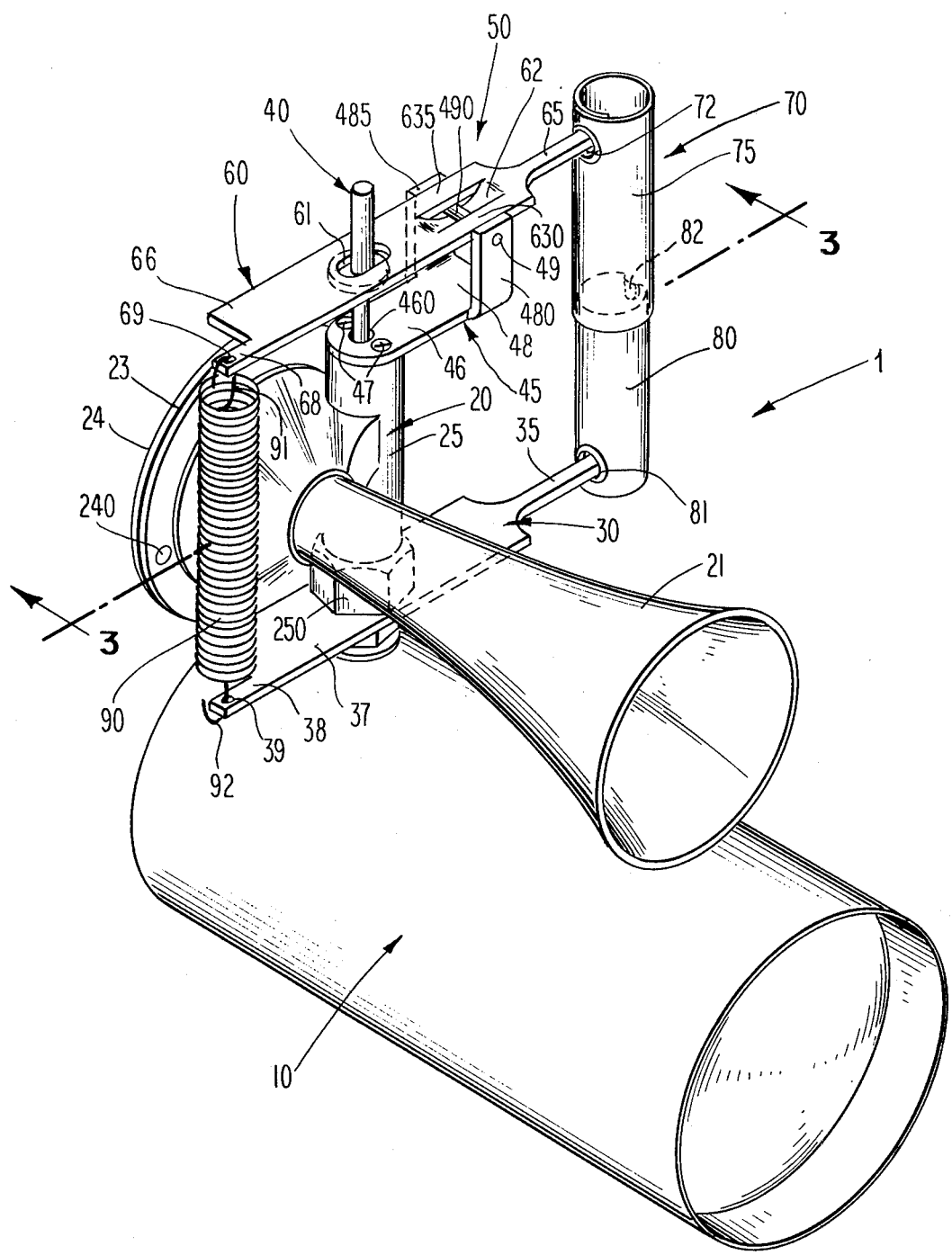
FIG. 1 is an isometric view of the heat sensor and alarm system of the present invention.
Figure 2:
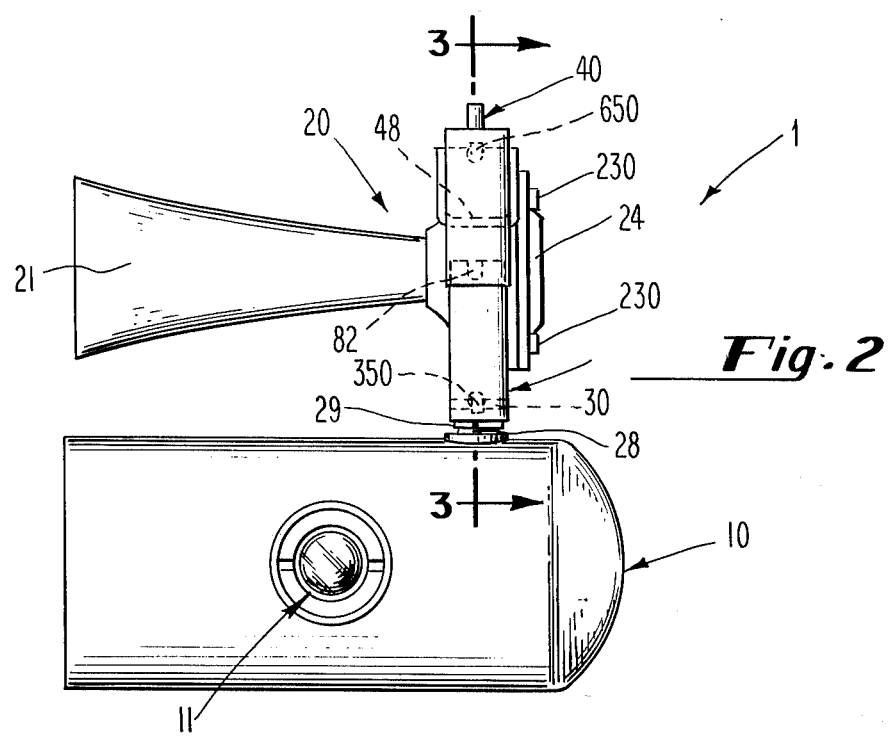
FIG. 2 is a side elevation of the heat sensor and alarm system of the present invention.

Referring now to FIGS. 1 and 2, an improved heat sensor 1 is shown to comprise compressed gas canister 10, horn assembly 20, and valve actuation means 50.

Canister 10 contains a quantity of compressed gas which in the preferred embodiment is Freon but may be any compressible gas suitable for heat sensing devices as is known in the art. I use Freon 12 since at room temperature it is contained in canister 10 at a relatively low pressure (70psi). As the temperature increases, the pressure in canister 10 increases, and, at temperatures of approximately 130° F. the pressure of the compressed gas increases significantly to insure proper pressure level for energizing an alarm. This minimizes potential loss of compressed gas due to leakage at room temperature, and insures proper pressure levels when conditions require the alarm to sound. Canister 10 is provided with a compressed gas level indicator 11 to permit easy visual indication of the compressed gas level within canister 10, and is a sight-glass indicator, well known in the art.

Referring now to FIGS. 1, 3, and 4, the horn assembly 20 comprises a horn 21 having an air passageway 22, a diaphragm 23 and a removable end plate 24 which operatively secured diaphragm 23 in horn 21, permitting access to same and air passageway 22 for maintenance purposes. End cap 24 forms an air tight seal with horn 21 and is secured thereto by screws 240 which are in threaded engagement with end cap 24 and the respective mating surfaces of horn 21. Integral with horn 21 is manifold 25 having a first passageway 26 in fluid communication with air passageway 22 of horn 21, through which compressed gases may flow. In the preferred embodiment, horn assembly 20 is fabricated of a single casting of zinc-aluminum alloy (hereinafter "zamak"), however, it may be molded or otherwise fabricated as is known in the art with other suitable metallic or plastic materials which are somewhat resistant to the heat and temperatures encountered by heat sensor systems. Manifold 25 is fabricated in a generally cylindrical form and has a base portion 250 which is hexagonally shaped. The interior of hollow conduit 26, in the region of manifold base portion 250, and canister 10 are both threaded (not shown) for threaded engagement with threaded fitting 28. In the preferred embodiment, fixed supporting member 30 is an elongate metal bar which is secured with manifold base portion 250 by valve body 29 by first engaging the threads of manifold base portion 250 with threaded fitting 28, and then sliding opening 31 of fixed supporting member 30 over threaded fitting 28. Opening 31 has a diameter slightly greater than threaded fitting 28 but less than the exterior portions of valve body 29. Valve body 29 is then turned onto threaded fitting 28 until it is flush with supporting member 30. Supporting member 30 is thus snuggly secured with manifold base portion 250.

Fixed supporting member 30 has a first portion 35 which is necked, forming a generally "T"-shaped tongue portion having a turned-down lip 350, and has a second portion 37 having an extended portion 38 with a small opening 39 to accept spring end 92 of spring 90.

Manifold 25 additionally contains a second passageway 355 being bored for fitted engagement with plunger 40 which is fabricated of stainless steel. Plunger 40 operatively engages second passageway 35, forming a relatively fluid tight seal therewith, yet is moveable therein in response to the operation of valve means 50. As will be described more fully hereinafter, plunger 40 is guided downwardly within manifold 25. and activates a canister release valve (not shown) to release compressed gas from canister 10 into and through threaded fitting 28 which forms a hollow conduit between canister 10 and manifold 25. The compressed gas flows into first passageway 26 and then into air passageway 22 of horn 21, as is indicated by arrows 15.

Horn assembly 20 also has a pivot support extension piece 45, which has a first portion 46 containing opening 460. Opening 460 has a greater diameter than upper portion 41 of plunger 40 and thus, permits plunger 40 to pass therethrough. Opening 460 is not, however, large enough to permit passage of base 42 of plunger hat 410. Pivot support extension piece 45 is secured with manifold 25 by threaded screws 47 and has a second portion 48 forming generally U-shaped flanges 480 and 485, each having bored holes 49, through which pin 490 is inserted and held in place forming a fulcrum.

Referring now to FIGS. 1 and 3, valve actuating means 50 comprises pivotal actuating member 60, sensing assembly 70, and spring 90. Valve means 50 cooperates with plunger 40 to release the compressed gas.

Pivotal actuating member 60 is an elongate metal bar having an eliptical opening 61 and a generally "U"-shaped stamped depression 62 together with the shoulders noted as members 630 and 635 which result from the aforementioned stamping operation form an opening in which pin 490 is journaled. Pivotal actuating member 60 has a first end portion 65 which has a necked portion forming a generally "T"-shaped tongue with a turned-up lip 650 that operatively engages hooking hole 72, and has a second end portion 66 which has an extended portion 68 having a small opening 69 to accept spring end 91 of spring 90.

Figure 7:
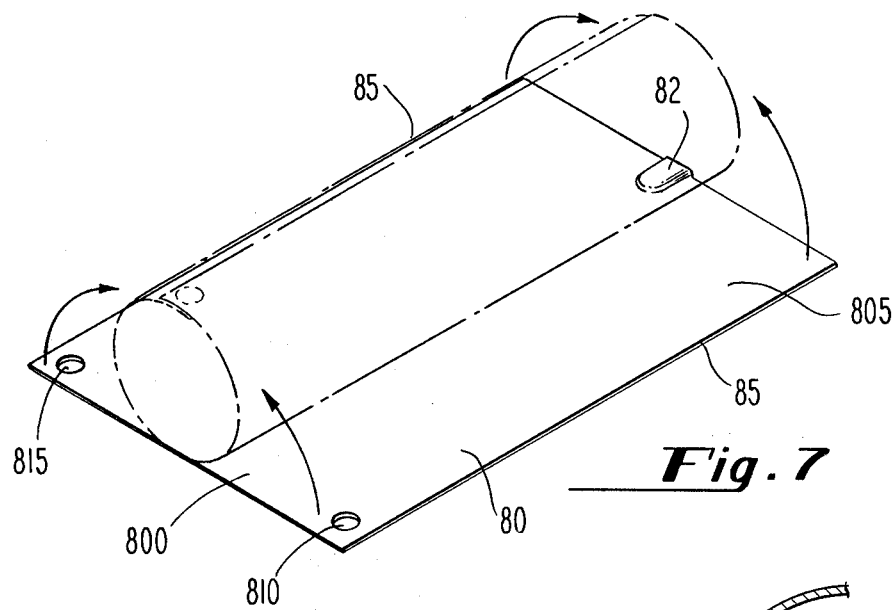
FIG. 7 is an isometric view illustrating how the lower inner cylindrical sleeve of the present invention is fabricated.
Figure 6:
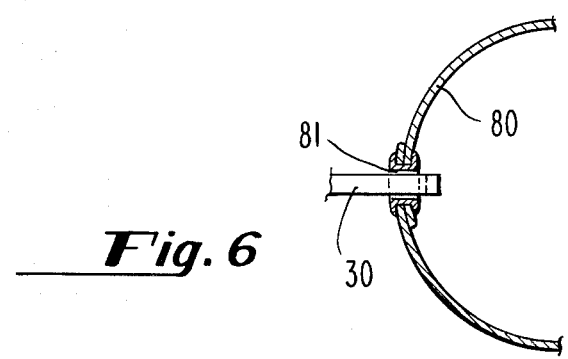
FIG. 6 is a sectional view taken along the line 6—6 as shown in FIG. 3.

Referring now to FIGS. 3, 5, 6, and 7, it can be seen that sensing assembly 70 is fabricated from an upper cylindrical outer sleeve 75 and a lower cylindrical inner sleeve 80, each of which is fabricated of a thin sheet of copper which is wrapped to form a cylinder. While the preferred material is copper, any material susceptible to being eutectically soldered and being a good heat collector and conductor may be utilized. The substantially cylindrical shaped sensing assembly 70 represents a compact assembly which permits a relatively large surface area to be exposed to the environment, yet enhances heat collection and sensitivity. FIG. 7 illustrates how the lower cylindrical inner sleeve 80 is fabricated. As is shown in FIG. 7, lower cylindrical inner sleeve 80 contains openings 810 and 815 bored therein in its lowermost portion 800 and contains a stamped pocket 82 at its uppermost portion 805. Pocket 82 is equidistant from edges 85 of sheet 80. To form the cylindrical shape from the sheet, edges 85 are wrapped so that they overlap and so that openings 810 and 815 are superimposed to form lower-most hooking hole 81. Upper cylindrical outer sleeve 75 is fabricated in the same manner as lower cylindrical inner sleeve 80 and has an I.D. that is slightly greater than the O.D. of lower cylindrical inner sleeve 80. Sleeves 75 and 80 telescopically engage so that lower most portion 750 overlaps stamped pocket 82 of lower cylindrical inner sleeve 80 forming an enclosed pocket for containing eutectic solder. Eutectic bond 100 is formed in the above enclosed pocket. The eutectic solder is formulated, as is known in the art, to melt at a predetermined temperature, which may, for example, be around 136° F. for applications in living areas or about 174° F. for applications around furnaces or in attics. When the environment reaches the predetermined elevated temperature, the eutectic solder fuses, destroying eutectic bond 100 and releasing telescopically engaged sleeves 75 and 80 which are then free to move relative to each other.

As is best shown in FIG. 3, plunger hat 410 has a top portion which passes through opening 61 of pivotal actuating member 60 and has a base portion 42 having a diameter greater than the largest portion of elongate opening 61. Therebelow, plunger 40 has a portion 41 of reduced diameter which in the preferred embodiment is less than the diameter of plunger hat 410 and which, as described above, operatively engages second passageway 35 of manifold 25 in relatively fluid tight condition. In communication with portion 41 is valve stem 43 which is of a diameter still more reduced than portion 41. Valve stem 43 constitutes a portion of the compressed gas canister release valve 50, which when activated releases the compressed gas in canister 10. The canister release valve is a special tire-type valve which upon the depression of valve stem 43 releases the compressed gas. The diameter of portion 41 is slightly larger than valve stem 43, yet is small enough to eliminate any binding with threaded fitting 28 which houses valve stem 43. Second passageway 355 also operates to guide plunger 40 and to insure its alignment with valve stem 43.

Referring now to FIGS. 1 and 3, it can be seen that spring 90 is a coiled spring of well known fabrication, having two end portions 91 and 92, respectively, with spring end 91 passing through opening 69 and spring end 92 passing through opening 39 of pivotal actuating member 60 and fixed supporting member 30, respectively. Coiled spring 90, as thusly attached, is in tensioned condition and since supporting member 30 is fixed, coiled spring 90 operates to create the forces indicated by arrows 95, and therefore, to positively disengage sensing assembly 70 to release the compressed gas and sound the alarm. Also, spring 90 is permitted to operate without interference from members 30 and 60 since it engages extended portions 38 and 68 which are shaped to facilitate engagement with spring ends 91 and 92.

In operation of improved heat sensor 1, as thus far described, pivotal actuating member 60 and sensing assembly 70 are in tensioned, yet stable condition, since cylindrical sleeves 75 and 80 are rigidly held by eutectic bond 100. Upper portion 420 of base 42 is in contact with underside 600 of pivotal actuating member 60, and portion 41 of plunger 40 is operatively positioned to depress valve stem 43 of the canister release valve. When the environment surrounding sensing assembly 70 is at sufficiently high temperatures and more particularly, when eutectic bond 100 reaches the predetermined elevated temperature, eutectic bond 100 fuses and sleeve 75 is released from sleeve 80 by the forces exerted by valve actuation means 50. Pivotal actuating member 60 pivots about pin 490 and tends to cant the upper portion of outer cylindrical sleeve 75 relative to its lower portion, moving same upwardly and inwardly (toward pin 490). Sleeve 75 is thus moved upwardly and inwardly to positively disengage it from sleeve 80. Second end portion 66 moves downwardly until base 42 is flush with the upper surface of pivot support extension piece 45 whereby plunger portion 41 depresses valve stem 43 which opens the canister valve releasing the compressed gas contained in canister 10 into and through hollow threaded fitting 28, first passageway 26 and air passageway 22, as is indicated by arrows 15. Diaphragm 23 is thereby energized and horn 21 will blow until the entire gas content of canister 10 is released or plunger 40 is manually withdrawn from its depressed position. In its depressed position, plunger 40 cooperates with second passageway 35 to prevent escape of gas therethrough and to direct same into air passageway 22; moreover, an "O"-ring (not shown) may be utilized on portion 41 beneath base 42 to further seal second passageway 355 at the upper surface of pivot support extension piece 45.

In summary, the improved heat sensor 1, operates to positively engage valve actuation means 50 to insure activation of horn 21 at the predetermined elevated temperature. This is in part effectuated by creating the forces as depicted by arrows 78 and 95 to insure separation of the outer cylindrical sleeve 75 from the inner cylindrical sleeve 80 at the earliest possible time. Such action is aided by lips 350 and 650 which positively engage hooking holes 72 and 81. It is further aided by the sensitivity and fabrication of sensing assembly 70 which has been found to efficiently collect heat and fuse eutectic bond 100 when the environment reaches the pre-selected temperature. The manner in which pivotal actuating member 60 is journaled with pivot support extension piece 45 and secured with outer cylindrical sleeve 75, stresses lower portion 750 of outer cylindrical sleeve 75 in such a manner that it tends outwardly (away from pin 490) and upwardly, away from the pocket 82 and therefore, outwardly and upwardly away from eutectic bond 100 in the manner shown by arrow 78. This insures separation of sleeves 75 and 80 at the earliest possible moment. It has been found that the elliptical or elongated circular opening 61 further facilitates positive activation of the alarm mechanism by permitting pivotal actuating member 60 to freely pivot about pin 490 without binding at the plunger top 410. Moreover, the generally "T"-shaped tongue portions of pivotal actuating member 60 and fixed supporting member 30 help insulate sensing assembly 70 from the remainder of device 1 to insure that sensing assembly 70 efficiently collects heat from the surrounding environment and transmits same to eutectic bond 100.

In another embodiment of the present invention surfaces of cylindrical sleeves 75 and 80 surrounding eutectic bond 100 are nickel coated to form a nickel barrier to preserve the quality of the eutectic solder and prevent its deterioration and thus, maintain the sensitivity of the heat sensor of the present invention.

It is understood that the foregoing represents particular embodiments of the principles of the present invention for illustrative purposes, and that numerous alternative embodiments will occur to those of ordinary skill in the art without departure from the spirit or scope of the present invention.

What is claimed is:

1. A heat sensor comprising:
   a support member having a fulcrum and first and second portions;
   an actuating member pivotally mounted with said support member and having first and second portions inversely moveable about said fulcrum;
   a spring operatively engaging in tensioned condition said first portion of said support member and said first portion of said actuating member; and
   heat responsive means for collecting heat from the environment and transferring same to a fusible means, said heat responsive means having two separable portions each bound to the other by said fusible means to form an interengaging assembly wherein said separable portions of said heat responsive means comprise a first cylindrical element operatively engaging said second portion of said actuating member and a second cylindrical element operatively engaging said second portion of said support member, said first and second cylindrical elements forming outer and inner cylindrical sleeves which telescopically engage each other and are fused together by a eutectic bond.

2. A heat sensor as in claim 1, further including horn means operatively engaging said actuating member for releasing compressed gas to sound an alarm in response to said actuating member.

3. A heat sensor as in claim 2, wherein said horn means further includes a canister of compressed gas, a release valve operatively engaging said canister, and a plunger operatively engaging said release valve and said actuating member.

4. A heat sensor as in claim 1, wherein said first and second cylindrical elements each have opposed faces constituting front and rear faces, said rear face defined by that portion of said cylindrical elements lying between and engaging said second portion of each of said support and actuating members, wherein said eutectic bond is formed at said front faces at a point where said cylindrical elements telescopically engage.

5. A heat sensor as in claim 4, wherein said fulcrum of said support member is located closer to said second portion than to said first portion of said support member.

* * * * *